(12) United States Patent
Laghrari

(10) Patent No.: US 7,310,521 B2
(45) Date of Patent: Dec. 18, 2007

(54) METHOD TO REDUCE MODEM CALL ESTABLISHMENT TIME TO A TELEMATICS UNIT

(75) Inventor: Fahd Z. Laghrari, Southfield, MI (US)

(73) Assignee: General Motors Corporation, Detroit, MI (US)

( * ) Notice: Subject to any disclaimer, the term of this patent is extended or adjusted under 35 U.S.C. 154(b) by 528 days.

(21) Appl. No.: 11/037,708

(22) Filed: Jan. 18, 2005

(65) Prior Publication Data

US 2006/0160575 A1    Jul. 20, 2006

(51) Int. Cl.
  *H04Q 7/20*    (2006.01)
  *H04M 3/22*    (2006.01)
  *G01C 21/00*   (2006.01)
(52) U.S. Cl. .............. 455/423; 455/414.1; 455/99; 379/26.01; 701/207
(58) Field of Classification Search .............. 455/423, 455/414.1, 426.1, 99, 115.1; 379/26.01; 701/207
  See application file for complete search history.

(56) References Cited

U.S. PATENT DOCUMENTS

| | | | |
|---|---|---|---|
| RE34,034 E * | 8/1992 | O'Sullivan | 455/557 |
| 6,263,055 B1 * | 7/2001 | Garland et al. | 379/106.05 |
| 6,775,270 B1 * | 8/2004 | Rhodes et al. | 370/352 |
| 7,012,993 B2 * | 3/2006 | Alton | 379/26.01 |
| 7,224,969 B2 * | 5/2007 | Stark et al. | 455/432.3 |
| 7,236,783 B2 * | 6/2007 | Gould | 455/435.1 |
| 7,239,859 B2 * | 7/2007 | Madhavan et al. | 455/403 |
| 7,242,966 B1 * | 7/2007 | Averkamp | 455/564 |
| 7,245,951 B2 * | 7/2007 | Oesterling et al. | 455/575.9 |
| 2004/0137960 A1 * | 7/2004 | Chung | 455/569.2 |
| 2005/0065779 A1 * | 3/2005 | Odinak | 704/201 |

* cited by examiner

*Primary Examiner*—Duc M. Nguyen

(57) ABSTRACT

A method for recognizing an attempted data connection in a wireless network between a telematics unit and a call center using a modem. During the connection attempt, a determination is made whether frequencies received through the modem are audio frequencies or data frequencies. The connection is abandoned prior to a time-out if frequencies received through the modem are audio frequencies.

20 Claims, 4 Drawing Sheets

METHOD TO REDUCE MODEM CALL ESTABLISHMENT TIME TO A TELEMATICS UNIT

FIELD OF THE INVENTION

The present invention generally relates to modem call establishment in a mobile vehicle communication system. The present invention specifically relates to reduction of modem call establishment time in a mobile vehicle communication system.

BACKGROUND OF THE INVENTION

In a mobile vehicle communications system, a modem is used to establish a telephony data connection from a call center to a telematics unit. The modem dials the telephone number and waits for a response, also known as a "handshake," to be sent from the telematics unit. If the wireless network is busy or is unavailable, the network sends a "network busy/customer unavailable" voice message within a few seconds. Current modems do not readily recognize the failure to establish the call, and have a typical timeout duration of sixty seconds or more.

Current network communications systems incorporating one or more outbound modems face several disadvantages. Such disadvantages often incur time delays in making connections due to one or more modems in the system being unavailable for an unacceptable length of time. In addition, typical systems depend upon an elaborate outbound re-try strategy in the event that a first connection attempt fails. Such re-try strategies often involve complex rules requiring unnecessary expenditures of time and functionality, usually to the disadvantage of overall system resources.

The present invention overcomes these disadvantages and advances the state of the art in mobile vehicle communication systems.

SUMMARY OF THE INVENTION

One aspect of the present invention provides a method for recognizing a data connection in a wireless network comprising attempting a data connection in the wireless network between a telematics unit and a call center using a modem; during the connection attempt, determining whether frequencies received through the modem are audio frequencies; and abandoning the connection attempt prior to a time-out if audio frequencies are determined.

Another aspect of the present invention provides a computer usable medium including a program for recognizing a data connection in a wireless network comprising computer code to attempt a data connection in the wireless network between a telematics unit and a call center using a modem; computer code to determine whether frequencies received through the modem are audio frequencies; and computer code to abandon the connection attempt prior to a time-out if an audio frequency is determined.

Another aspect of the present invention provides a system for recognizing a data connection in a wireless network comprising means for attempting a data connection in the wireless network between a telematics unit and a call center using a modem; means for determining whether frequencies received through the modem are audio frequencies; and means for abandoning the connection attempt prior to a time-out if an audio frequency is determined.

The aforementioned and other features and advantages of the invention will become further apparent from the following detailed description of the presently preferred embodiments, read in conjunction with the accompanying drawings. The detailed description and drawings are merely illustrative of the invention rather than limiting the scope of the invention being defined by the appended claims and equivalents thereof.

DETAILED DESCRIPTION OF THE PREFERRED EMBODIMENTS

Figure 1:
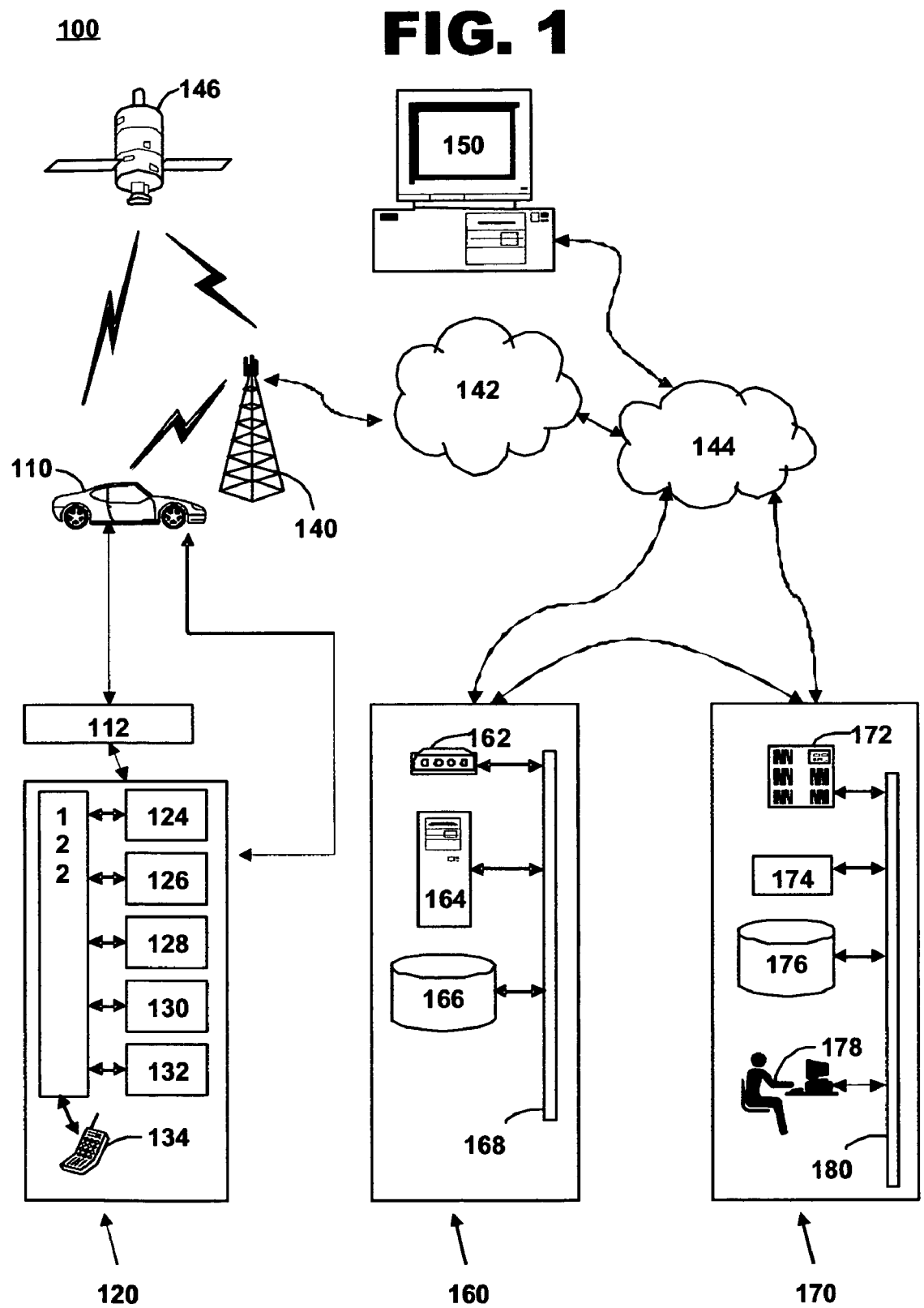
FIG. 1 illustrates an operating environment for a mobile vehicle communication system having reduced modem call establishment time.

FIG. 1 illustrates an operating environment for a mobile vehicle communication system ("MVCS") 100 reducing modem call establishment time. MVCS 100 includes a mobile vehicle communication unit ("MVCU") 110, a vehicle communication network 112, a telematics unit 120, one or more wireless carrier systems 140, one or more communication networks 142, one or more land networks 144, one or more satellite broadcast systems 146, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, marine vehicle or as an aircraft. MVCU 110 may include additional components not relevant to the present discussion.

Vehicle communication network 112 sends signals to various units of equipment and systems (detailed below) within MVCU 110 to perform various functions such as unlocking a door, opening the trunk, setting personal comfort settings, and calling from telematics unit 120. These functions are performed by sending electronic instructions to a vehicle module configured to perform a certain task or function. In facilitating interactions among the various communication and electronic modules, vehicle communication network 112 utilizes network interfaces such as controller-area network, International Organization for Standardization ("ISO") Standard 9141, ISO Standard 11898 for high speed applications, ISO Standard 11519 for lower speed applications, and Society of Automotive Engineers Standard J1850 for high speed and lower speed applications.

Telematics unit 120 sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system ("GPS") unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion. Telematics unit 120 is one example of a vehicle module.

In one embodiment, processor 122 is implemented as a microcontroller, controller, host processor, or vehicle communications processor. In one embodiment, processor 122 is a digital signal processor. In an example, processor 122 is implemented as an application specific integrated circuit. In another embodiment, processor 122 is implemented as a processor working in conjunction with a central processing unit performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode, or multi-band cellular phone.

Processor 122 executes various computer programs that control programming and operational modes of electronic and mechanical systems within MVCU 110. Processor 122 controls communication (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and vehicle communication network 112 that is connected to various electronic modules in the vehicle. In one embodiment, these digital signals activate the programming mode and operation modes, as well as provide data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 46 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band of 2.3 GHz that has been allocated by the U.S. Federal Communications Commission for nationwide broadcasting of satellite-based Digital Audio Radio Service.

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, processor 122 implements data packets received by telematics unit 120.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network. In another embodiment, land network 144 is implemented as an Internet Protocol ("IP") network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browsers and Internet-access computer programs for sending and receiving data over land network 144 and, optionally, wired or wireless communication networks 142 to web-hosting portal 160 through a web-page interface using communication standards such as hypertext transport protocol, and transport-control protocol and Internet protocol. In one embodiment, the data include directives to change certain programming and operational modes of electronic and mechanical systems within MVCU 110.

In operation, a client utilizes computer 150 to initiate setting or re-setting of user preferences for MVCU 110. In an example, a client utilizes computer 150 to provide radio station presets as user preferences for MVCU 110. User-preference data from client-side software is transmitted to server-side software of web-hosting portal 160. In an example, user-preference data are stored at web-hosting portal 160.

Web-hosting portal 160 includes one or more data modems 162, one or more web-servers 164, one or more databases 166, and a network system 168. Web-hosting portal 160 is connected directly by wire to call center 170, or connected by phone lines to land network 144, which is connected to call center 170. In an example, web-hosting portal 160 connects to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that are then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web server 164-hosting portal 160 through a wireless communication network 142 and a land network 144. Data are received by land network 144 and sent to one or more web servers 164. In one embodiment, web server 164 is implemented as any suitable hardware and software capable of providing web server 164 services to help change and transmit personal preference settings from a client at computer 150 to telematics unit 120. Web server 164 sends to or receives from one or more databases 166 data transmissions via network system 168. Web server 164 includes computer applications and files for managing and storing personalized setting supplied by the client, such as door lock/unlock behavior, radio station preset selections, climate controls, custom button configurations, and theft alarm settings. For each client, the web server 164 server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as databases 166. In an example, database 166 is a part of or a separate computer from web server 164. Web server 164 sends data transmission with user preferences to call center 170 through land network 144.

Call center 170 is a location where many calls are received and serviced at the same time, or where many calls are sent at the same time. In one embodiment, the call center is a telematics call center facilitating communications to and from telematics unit 120. In another embodiment, the call center is a voice call center, providing verbal communications between an advisor in the call center and a subscriber in a mobile vehicle. In yet another embodiment, the call center contains each of these functions. In other embodiments, call center 170 and web server 164 and hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one of more web server 164 and hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmission via network system 180.

Communication services manager 174 sends to or receives from one or more communication services advisors 178 data transmission via network system 180. Communication services database 176 sends or receives from communication services advisor 178 data transmissions via network system 180. Communication services advisor 178 receives from or sends to switch 172 voice or data transmissions. Communication services manager 174 provides one or more of a variety of services including initiating data over voice channel wireless communication, enrollment services, navigation assistance, directory assistance, roadside assistance, business or residential assistance, information services assistance, emergency assistance, and communications assistance. Communication services manager 174 receives service-preference requests for a variety of services from the client computer 150, web server 164, hosting portal 160, and land network 144. Communication services manager 174 transmits user-preference and other data such as, for example, primary diagnostic script to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178. In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to a telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140, and satellite broadcast system 146. In this embodiment, an inbound communication is routed to call center 170 from telematics unit 120 via wireless carrier system 140, communication network 142, and land network 144.

Referring to FIG. 1, wireless modem 162 is present in call center 170. Modem 162 serves to establish a telephony data connection, as opposed to a voice connection, from call center 170 to telematics unit 120. Modem 162 dials the telephone number of the telematics unit 120, sends a modem handshake request tone, and awaits a proper response signal to be returned by the telematics unit indicating availability for data communication. A proper response signal from the telematics unit includes a data frequency carrier component.

Before the connection is completely established however, during the handshake, a frequency determination or analysis monitors the response signal from telematics unit 120 to verify that a proper data frequency carrier component is being used. In one embodiment, the monitoring is within modem 162, while in other embodiments, the frequency monitor is in communication with modem 162. Upon verification of the response signal (meaning that a data frequency carrier component is being used by the telematics unit 120), modem 162 determines that a successful handshake has occurred, completely establishes the connection between itself and the telematics unit 120, and allows transmission and reception of data between the call center 170 and the telematics unit 120.

As used herein, the term "audio frequency" or "audio frequencies" mean tones or frequencies intended to be comprehensible and understandable to a human ear. For example, tones generated in a handshake attempt are not audio frequencies as that term is used herein. For example, a "user not available" speech is an audio frequency. In one embodiment, audio frequencies are indicative of a human voice.

Figure 2:
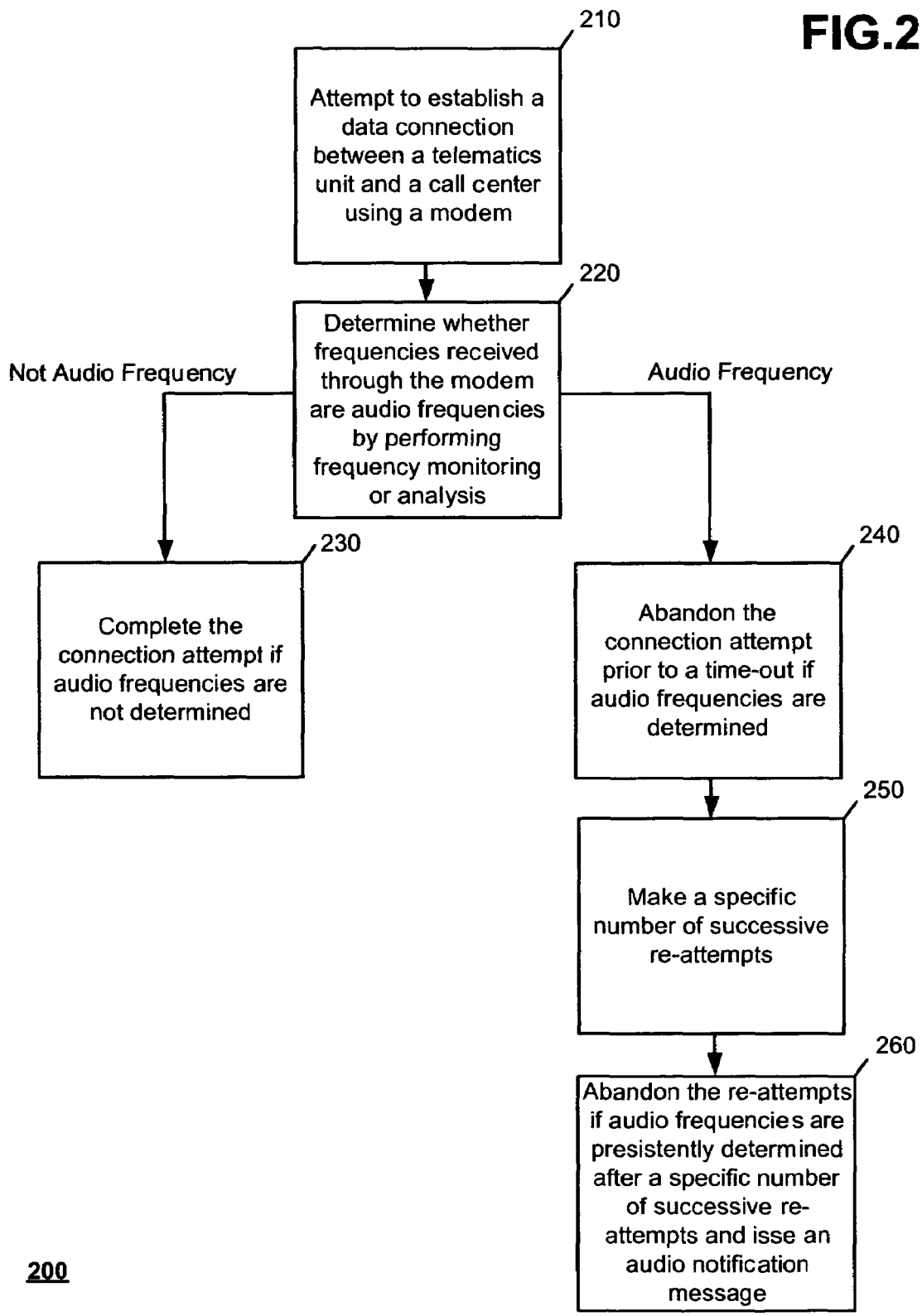
FIG. 2 illustrates a process flow diagram of a method to reduce modem call establishment time in accordance with the present invention.

FIG. 2 illustrates a process flow diagram of a method to reduce modem call establishment time in accordance with the present invention.

The process flow diagram 200 sets forth a method of attempting to establish an outbound data connection from a call center to a telematics unit by using a modem (block 210), performing frequency monitoring or analysis on frequencies received from the telematics unit through the modem to determine whether the received frequencies are audio frequencies (block 220), abandoning the connection attempt prior to a predetermined time-out (less than sixty seconds) if audio frequencies are determined (block 240) re-attempting the connection after a specific time-out (less than sixty seconds) if the received frequencies are audio frequencies (block 250), and abandoning the connection re-attempts and issuing an audio notification message, such as either a "Network Busy/Customer Unavailable" or "Connection Failure/Time-out" in the event that audio frequencies are persistently determined after a specific number of successive re-attempts (block 260). If a data connection to the telematics unit can be made, the connection is completed (block 230).

Figure 3:
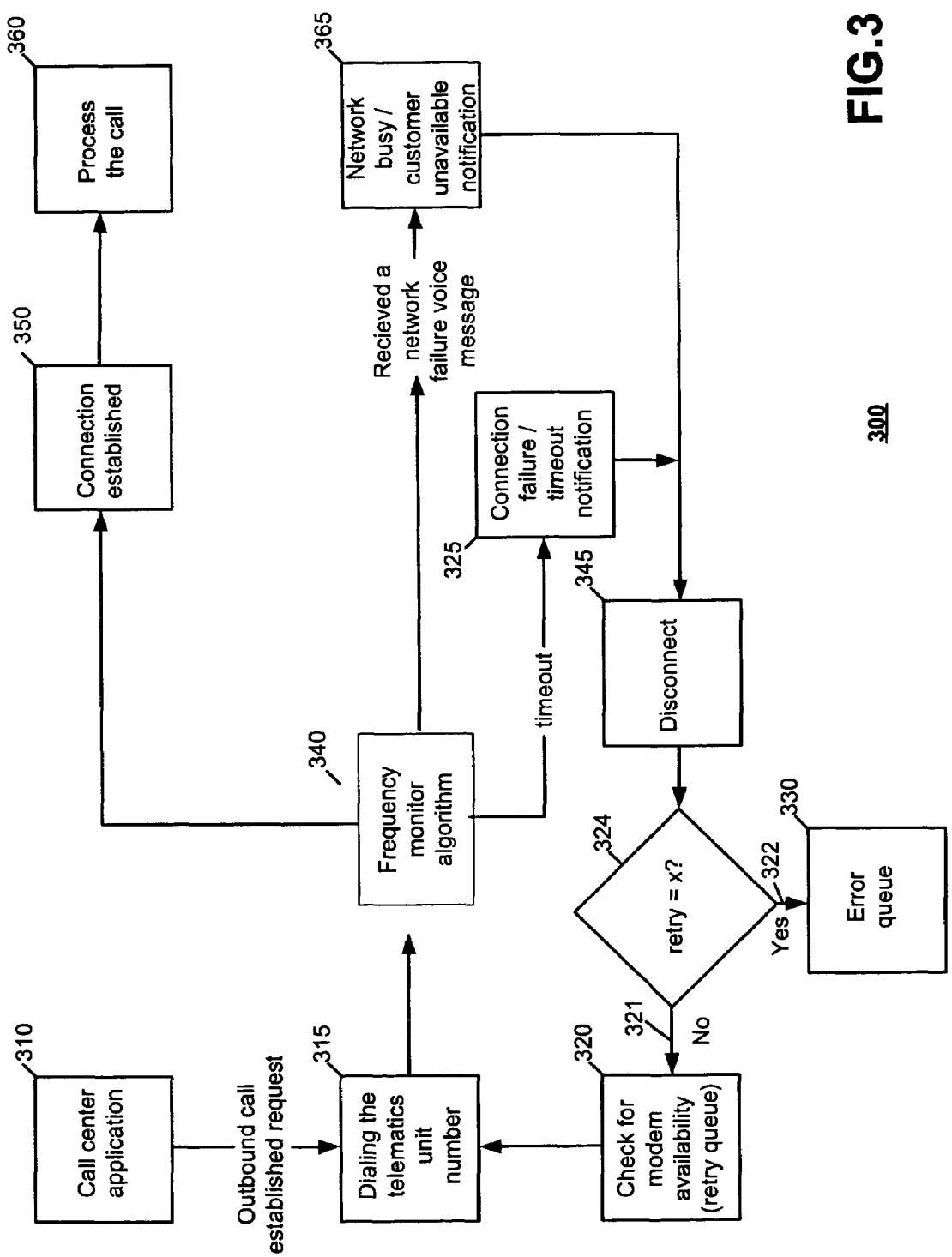
FIG. 3 illustrates a process flow diagram of another method to reduce modem call establishment time in accordance with the present invention.

FIG. 3 illustrates a process flow diagram of another method to reduce modem call establishment time in accordance with the present invention.

In block 310 of the process flow diagram 300, an outbound call establishment request is sent over the wireless network from the call center, including dialing the telephone number (block 315) of the intended telematics unit 120. Modem 162 sends a request tone over the network in an attempt to make a data connection with telematics unit 120.

In block 340, a frequency is monitored and a determination concerning whether the modem response tone received from telematics unit 120 is an audio frequency. If the modem response tone is not an audio frequency, then a data connection between modem 162 and the call center 170 is established in block 350. Once the data connection is established, the call is processed, block 360, and execution of the desired call center application commences, block 310.

If an audio frequency is persistently determined the data connection attempt is abandoned and an audio "Network Busy/Customer Unavailable" voice message notification is issued (block 365).

In response to a persistently failed connection between modem 162 and telematics unit 120, the attempt to complete a data connection is abandoned. In one embodiment, a time-out duration of a predetermined time period is applied prior to abandonment. For example, the time-out duration is less than sixty seconds. The time-out duration can be as short as five seconds. Abandonment involves the issuance of a "Connection Failure/Time-out" notification voice message (block 325), followed by the disconnection (block 345).

Decision point 324 concerns determining whether a re-try (re-attempt) of the connection should be attempted based upon execution and implementation of a re-try (re-attempt) strategy, and if so, after what passage of time should the re-try be attempted and how many re-try (re-attempts) should be made. Decision point 324 also determines whether the possibility of a substantial network error condition exists.

If, after a sufficient number of failures in attempt to make a data connection between modem 162 and telematics unit 120 are made, and it is determined in decision point 324 that a substantial network error condition does exist (YES condition 322), process 300 is directed to the Error Queue 330 for investigation and prompt resolution by proper call center application/group and/or network service technicians.

If a NO condition 321 indicating proper function of the network (no network failure) issues from decision point 324, a data connection attempt between modem 162 and telematics unit 120 will reoccur after a sufficient passage of time. Condition 321 leads to block 320 (Check for Modem Availability) which places the connection attempt in a re-try queue.

Block 320 leads to block 315 (Dialing the Telematics Unit Number), which leads to repetitive performance of subsequent activities as discussed above until a successful completion of the data connection is made.

Figure 4:
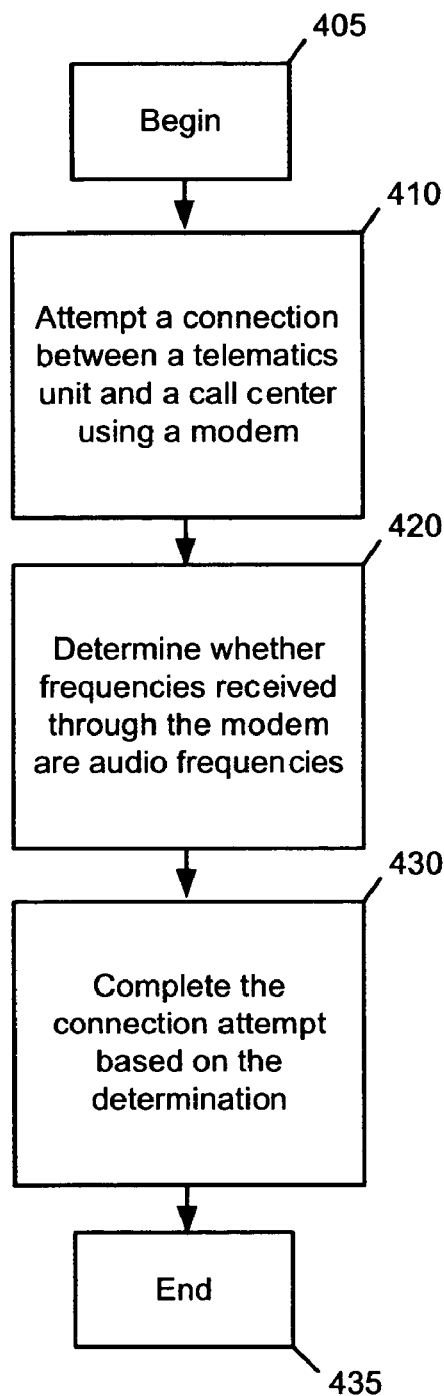
FIG. 4 illustrates a process flow diagram of another method to reduce modem call establishment time in accordance with the present invention.

FIG. 4 illustrates a process flow diagram of another method to reduce modem call establishment time in accordance with the present invention.

The process flow diagram 400 sets forth a method for establishing a data connection over a wireless network between a call center and a vehicle having a telematics unit. The call center and the telematics unit each have compatible data communication modems configured to allow wireless communication.

The method begins at block 405 in the call center using a wireless network to attempt a data communication connection (block 410) with the telematics unit of the vehicle by calling the number of the telematics unit. The call center awaits an answer to the call from the telematics unit.

In block 420, a determination is made as to whether frequencies received through the modem are audio frequencies. If the frequencies received through the modem are not audio frequencies, the modem in the telematics unit answers the modem in the call center by returning a data connection response signal to the modem in the call center (block 320) indicating that the data communication attempt between the call center and the telematics unit may then be completed (block 430). Once the data connection attempt is completed, a desired call center application is performed and the method ends (block 435).

However, if no data connection response signal is received by the call center modem from the modem in the telematics unit indicating that data communication between the call center and the telematics unit can be conducted, the call center will again call the number of the telematics unit after the passage of a sufficient amount of time, typically less than sixty seconds.

If after a predetermined number of re-attempts (re-tries) a data connection response signal is still not received from the modem in the telematics unit, a data connection failure message will be issued over the wireless network, and a network service administrator will be informed of the data connection failure so that corrective action can be taken. In one embodiment, the predetermined number of re-attempts is three.

The present invention may be embodied in other specific forms without departing from the spirit or essential characteristics. The described embodiments are to be considered in all respects only as illustrated and not restrictive.

What is claimed is:

1. A method for recognizing a data connection in a wireless network, comprising:
   attempting a data connection in the wireless network between a telematics unit and a call center using a modem;
   during the connection attempt, determining whether frequencies received through the modem are audio frequencies; and
   abandoning the connection attempt prior to a time-out if audio frequencies are determined.

2. The method of claim 1, wherein determining includes performing at least one of the actions selected from the group consisting of frequency monitoring and analysis.

3. The method of claim 1, wherein the audio frequencies are indicative of a human voice.

4. The method of claim 1, wherein the time-out is less than sixty seconds.

5. The method of claim 1, further comprising:
   re-attempting the connection after the time-out if an audio frequency is determined.

6. The method of claim 5, wherein a predetermined number of successive re-attempts are made.

7. The method of claim 1, further comprising:
   abandoning the connection attempt if the audio frequency determination persists and issuing an audio notification message including network busy/customer unavailable or connection failure/time-out.

8. A computer usable medium including a program for recognizing a data connection in a wireless network, comprising:
   computer code to attempt a data connection in the wireless network between a telematics unit and a call center using a modem;
   computer code to determine whether frequencies received through the modem are audio frequencies; and
   computer code to abandon the connection attempt prior to a time-out if an audio frequency is determined.

9. The computer usable medium of claim 8, wherein the audio frequencies are indicative of a human voice.

10. The computer usable medium of claim 9, further comprising:
    a computer program code for abandoning the connection attempt if the audio frequency determination persists.

11. The computer usable medium of claim 8, further comprising a computer program code to perform frequency monitoring or analysis.

12. The computer usable medium of claim 8, wherein the time-out is less than sixty seconds.

13. The computer usable medium of claim 8, further comprising:
    a computer program code to successively re-attempt the connection if an audio frequency is determined.

14. The computer usable medium of claim 13, wherein the re-attempt occurs after the time-out.

15. A system for recognizing a data connection in a wireless network, comprising:
    means for attempting a data connection in the wireless network between a telematics unit and a call center using a modem;
    means for determining whether frequencies received through the modem are audio frequencies; and
    means for abandoning the connection attempt prior to a time-out if an audio frequency is determined.

16. The system of claim 15, wherein the audio frequencies are indicative of a human voice.

17. The system of claim 15, further comprising:
    means for performing frequency monitoring or analysis.

18. The system of claim 15, wherein the time-out is less than sixty seconds.

19. The system of claim 15, further comprising:
    means for successively re-attempting the connection if an audio frequency is determined.

20. The system of claim 15, further comprising:
    means for abandoning the connection attempt if the audio frequency determination persists and issuing an audio notification message including network busy/customer unavailable or connection failure/time-out.

* * * * *